United States Patent [19]

Corsover

[11] 4,168,506
[45] Sep. 18, 1979

[54] FILM GUIDE FOR OPTICAL SCANNERS

[75] Inventor: Stephen L. Corsover, Philadelphia, Pa.

[73] Assignee: RCA Corporation, New York, N.Y.

[21] Appl. No.: 832,284

[22] Filed: Sep. 12, 1977

[51] Int. Cl.² ........................................... G01D 15/14
[52] U.S. Cl. .................................. 346/108; 346/136; 358/206
[58] Field of Search ............ 346/108, 109, 136, 76 L; 352/228, 222, 223; 360/102, 103; 358/206, 285, 292, 293, 302, 297; 350/6.5–6.91; 226/88

[56] References Cited

U.S. PATENT DOCUMENTS

| | | | |
|---|---|---|---|
| 2,292,481 | 8/1942 | Rinia | 358/206 |
| 2,307,099 | 1/1943 | Apperley | 352/228 X |
| 3,273,953 | 9/1966 | Davee | 352/228 X |
| 3,314,073 | 4/1967 | Becker | 346/76 L |
| 3,334,353 | 8/1967 | Everest | 346/76 L |
| 3,347,437 | 10/1967 | Rush | 226/198 |
| 3,416,148 | 12/1968 | Berghaus | 360/102 X |
| 3,463,882 | 8/1969 | Herbold | 358/206 |
| 3,533,058 | 10/1970 | Platter | 360/102 |
| 3,874,621 | 4/1975 | Blair | 346/108 |
| 4,025,154 | 5/1977 | Yuta | 358/206 X |
| 4,074,283 | 2/1978 | Fink | 346/139 C |

OTHER PUBLICATIONS

Gramenopoulos et al.; Advanced Laser Image Recorder; Applied Optics, Dec. 1972, pp. 2778–2782.
Hartfield, Ed.; Recorders: Flat vs. Cylindrical; Laser Focus, Apr. 1973, pp. 47–49.

Primary Examiner—Joseph W. Hartary
Attorney, Agent, or Firm—H. Christoffersen; Joseph D. Lazar; John P. McMahon

[57] ABSTRACT

There is disclosed a record media guide for optical scanners to position accurately the record media such as film during both the recording as well as the reading mode. The film guide provides a gaseous bearing to reduce film wear, prevents the deformation of film edge curl and allows for optical scanning without reflections.

4 Claims, 3 Drawing Figures

FILM GUIDE FOR OPTICAL SCANNERS

CROSS REFERENCE TO RELATED APPLICATIONS

This application is related to the following copending applications, U.S. Application Ser. No. 790,662, filed Apr. 25, 1977, entitled "Apparatus for Developing Photographic Images on an Emulsion Coated Film," by Richard David Scott, and U.S. Application Ser. No. 790,196, filed Apr. 25, 1977, entitled "Thermal Processor in an Apparatus for Developing Photographic Film," by Bohdan Wolodymyr Siryj, et al., all assigned to the same assignee as the assignee of the present invention.

BACKGROUND OF THE INVENTION

1. Field of the Invention

The present invention relates to optical scanners and in particular to a film guide for such scanners.

2. Description of the Prior Art

Optical scanners, particularly laser scanners have been successfully employed to provide a permanent record of video signals by thermal and ablative recording on media such as photographic film.

Such scanners, particularly laser scanners may be of the straight line or of the curved line type. See an article entitled "Recorders: flat vs cylindrical" by Ed Hartfield in *Laser Focus,* pp. 47–49, April, 1973, for a description of flat field and cylindrical surface scanners. The term "straight line" scanning is commonly referred to as flat field scanning in the field of optics, while the term "curved line" scanning refers to "circular" scanning developed on curved or cylindrical surfaces, curved relative to the focused beam. The present invention is concerned with flat field (straight line) scanning. In either type, a transverse scan of a focused laser beam, i.e., a scan across the direction of movement of the recording medium, is used to record or read information into or from the media. In all types of laser scanners the film must be positioned accurately with respect to the optics in order to maintain focus. Accurate positioning becomes more critical as the desired system resolution increases.

The film positioning mechanisms for flat field scanners are complicated by the natural tendency of the photographic roll film, to curl away from the plane of the film in a direction perpendicular to its length when unrolled, i.e., to curl along the edges. The edge curl causes substantial non-uniformities in film spacing across its width and thereby severely reduces the fidelity of recording and reading near the side edges. Edge curl control systems have been proposed as by U.S. Pat. No. 3,533,058 to Sandford Platter, entitled "Edge Curl Control for a Flat Vacuum Head," issued Oct. 6, 1970. This patent describes a system using magnetic tapes.

In flat field scanners, utilizing a cylindrical surface to carry the film to the scanning position, rollers are used to guide the film before and after the laser scanning position. The rollers are suitably spaced and tensioned to inhibit film edge curling. In such scanners light which passes through the film during recording or playback modes is reflected back onto the film by the surface of the cylinder. This back reflection causes scattered light to reduce system performance with respect to resolution, and maximum density and furthermore reduces clarity by increasing what is known in the art as "background fog." A typical system is shown in an article entitled "Advanced Laser Image Recorder" published in *Applied Optics,* December, 1972, pages 2778–2782.

It is further known to use a gaseous bearing for supporting the film as it moves over the scanning or processing zone. See for example, U.S. Pat. No. 3,416,148 to Donald G. Berghaus, et al., entitled "Compound Radius Transducer Head," issued Dec. 10, 1968. See also U.S. Pat. No. 3,347,447 to C. D. Rush, entitled "Tape Guidance System," issued Oct. 17, 1967. The fluid bearing of air reduces wear by eliminating mechanical contact between a tape and a transducer head.

SUMMARY OF THE INVENTION

According to this invention, a film guide is provided for optical scanners. The optical scanner employs an optical beam which is scanned in a direction transverse to the length of the film. The scanner processing area is formed by a spacing between two curved members forming the film guide providing passage of the optical beam onto film. Means are provided to advance over the curved surface film which has the inherent property to curl in the transverse direction of its length. The members may have the surfaces facing the film arranged to allow for pressurized air contained in internal cavities therein to be discharged for generating a gaseous bearing between the surface and the film advancing over the film guide.

DESCRIPTION OF THE PREFERRED EMBODIMENT

The present invention relates to laser scanning systems which provide a permanent record of signals, such as video signals or digital data signals, by thermally or ablative recording on a medium such as film. The information recorded may be retrieved by the reading (playback) operation or mode of the system. The extremely small dimension of the laser beam has been utilized notably in systems employing photo-sensitive recording film whereby large quantities of information may be stored in relatively small volumes of compiled storage surfaces.

The preferred embodiment to be described particularly relates to flat field laser scanners which use a transverse scan in which a focused laser beam is scanned on a line-by-line basis perpendicular to the direction of the film motion. The geometric "fidelity" in the scan direction is controlled by moving the beam at a constant velocity across the recording medium. A suitable flat field lens 11 comprising a plurality of lens elements is placed in the path of the optical axis to focus the beam from a rotating polyhedric mirror 15 onto the film at a constant velocity.

Figure 1:
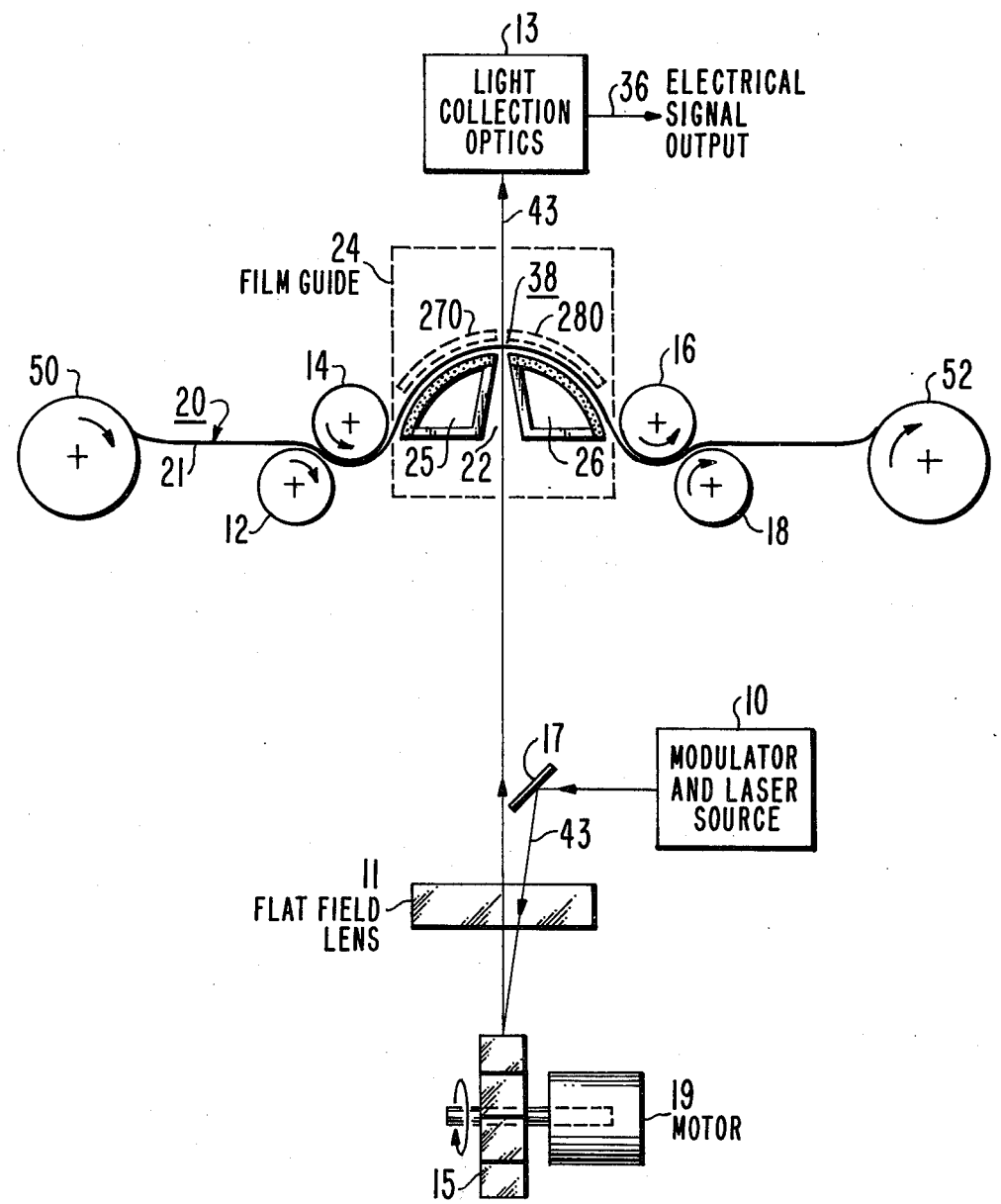
FIG. 1 is a block diagram of a laser scanner embodying the present invention.

The modulator and laser source 10, mirror 17, rotating polyhedric mirror 15, and flat field lens 11 of FIG. 1 are well known and need not be described in greater detail. See U.S. Pat. No. 4,025,154 for one type of a linear scanning system.

FIG. 1 is a schematic of a system utilizing the present invention. The modulator and laser source 10 transmits laser beam 43 onto the surface 21 of film at the focal point exposure area 38. The laser may be modulated for recording purposes by the modulator of the laser source 10. (No modulation is used for the playback modes). The beam 43 passes through a passageway 22 (the taper shown being exagerated) provided in film guide 24 shown in greater detail in FIG. 2, to be described. The modulated light represents the intensity of the image or digital information data bits to be thermally or ablatively recorded. The film 20 may be of the type that is responsive to ablative, photo-chemical or dry thermally sensitive film recording techniques. Suitable processing of the photo-chemical and thermally sensitive types of film are provided as known in the art while ablative type film requires no further processing. Reference is made to the above-identified applications for a processing system for thermally sensitive film. The recorded image or information effects a change in the transparency of the film for playback or reading purposes.

In the playback or reading mode of film 20, the laser source 10 transmits light (non-modulated) onto the film surface 21 passing across the exposure area 38 whereby the recorded information modulates the light. The modulated light is then received by light collection optics 13 to generate an electrical signal output 36 representative of the recorded signal.

Film 20 is supplied to the system from storage or supply reel 50 and is advanced over the guide 24 at a suitable velocity and tension, utilizing input rollers 12 and 14, output rollers 16 and 18, roller 18 being of the capstan type, and take-up reel 52 suitably arranged to achieve the desired movement and tension of the film. The film 20 is wound onto the take-up roll 52 for subsequent treatment or use.

Figure 2:
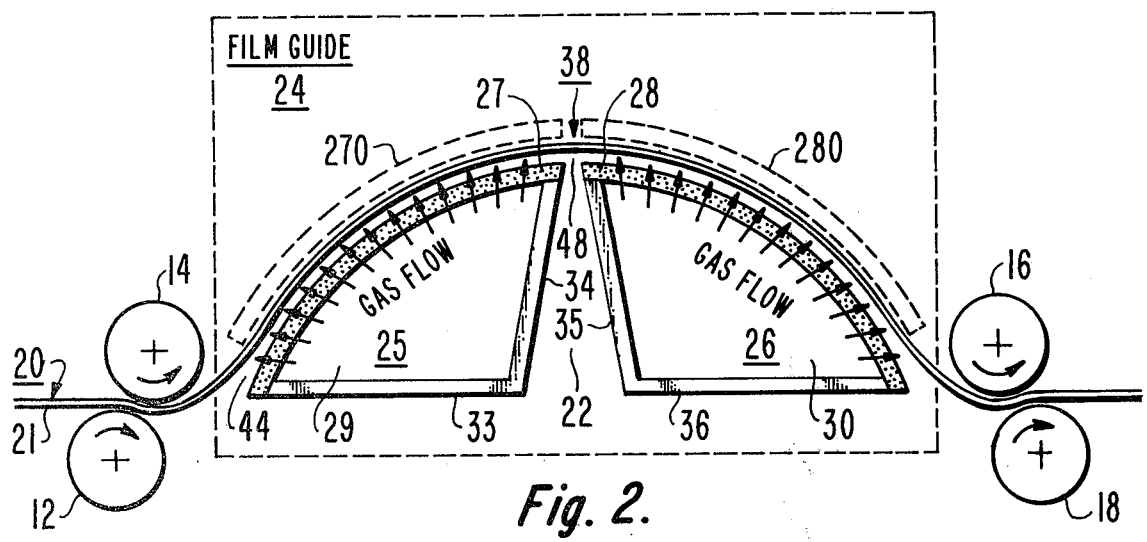
FIG. 2 is a detailed diagram of the film guide of the scanner shown in FIG. 1.
Figure 3:
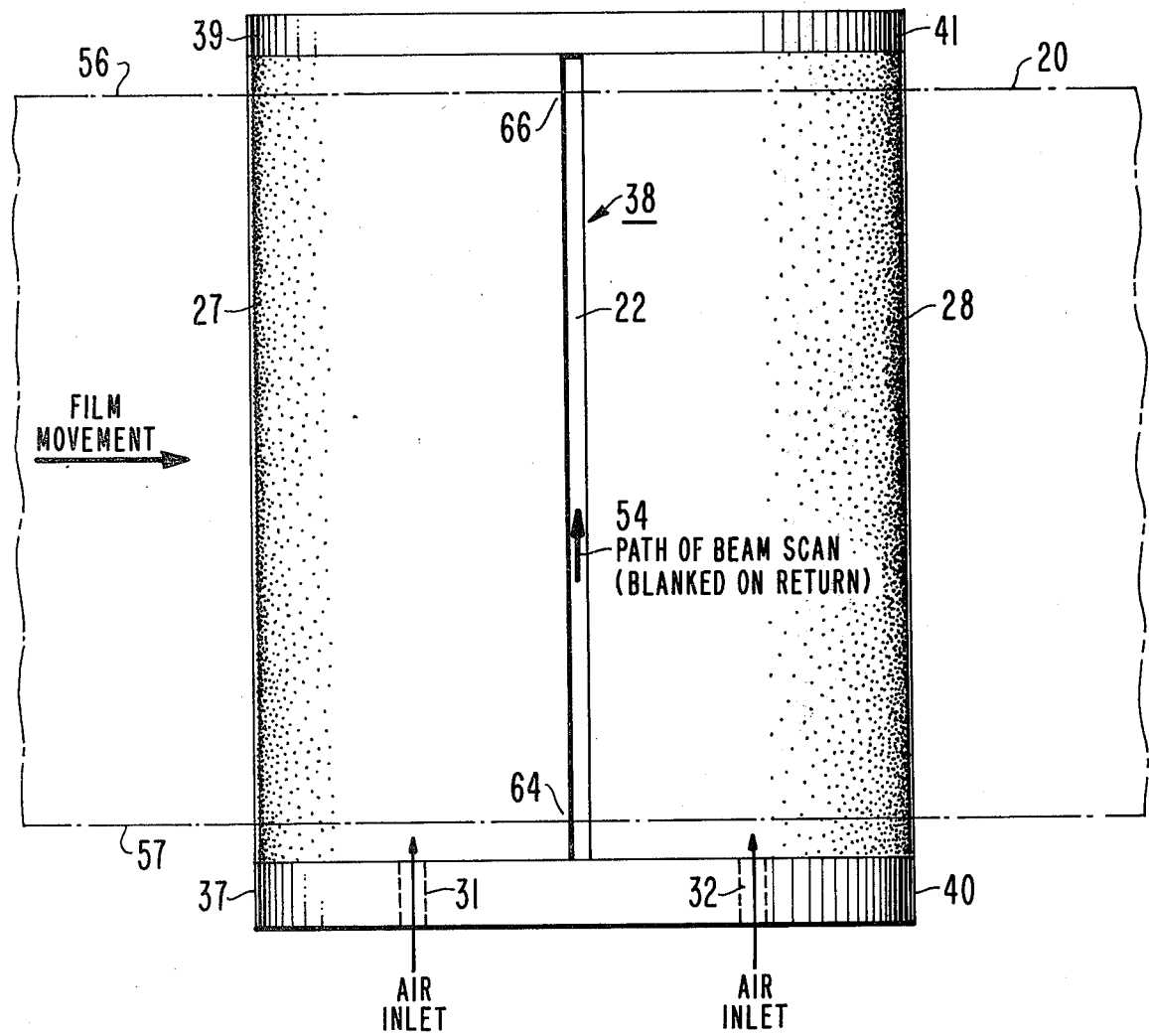
FIG. 3 is a schematic of a plan view of the film guide showing the direction of laser scan across the film.

Reference is now made to FIGS. 2 and 3 which illustrate in detail film guide 24. Guide 24 is formed of two, symmetrical, hollow members 25 and 26, each having in cross-section the general form of a quadrant of a cylinder. The respective surfaces 27 and 28 over which the film 20 is passed are formed of a porous material such as porous bronze or pressed graphite arranged to pass a gaseous material such as air radially outwardly from the respective inner hollow chambers cavities 29 and 30. Air is supplied to the cavities 29 and 30 via passageways 31 and 32 as shown in FIG. 3. Inner walls 33, 34, 35 and 36 shown on FIG. 2, are solid, and together with end walls 37, 39, 40 and 41, shown on FIG. 3, close the cavities 29 and 30. The two members 25 and 26 are suitably supported in the fixed relative positions shown within the housing structure of the system. The members 25 and 26 are spaced apart to define the passageway 22 tapered to a reduced width in the processing area 38. Passageway 22 serves as an aperture for the beam 43 to be scanned across the film surface 21 as shown in FIG. 3 along the scan path indicated by arrow 54. The taper of passageway 22 as shown is exaggerated. The actual dimension at the exposure area 38 is quite small, i.e., in the order of 0.020 inches (0.508 mm), the taper of passageway 22 being such as to allow for the laser beam 43 to pass therethrough and be focused at the exposure area 38. Film guide 24 having a cylindrical surface but, in general, any curved surface, serves to eliminate the tendency for edge curling along either of the running edges 56 or 57, shown on FIG. 3.

It is believed that the prevention of the edge curl is achieved by the deformation of the film 20 by curving it along its longitudinal axis causing stresses thereby that are significantly greater than the forces that would otherwise tend to develop the edge curl. It appears, nevertheless, that certain properties of the materials forming films used in the art will determine the extent of edge curling and how effective mere longitudinal deformation, i.e., passing the film over a curved guide, will prevent such curling. The known films typically have the properties of low elasticity, high transversal stiffness and high longitudinal flexibility useful to prevent the edge curling effect in the practice of the present invention. Accordingly, the rollers (12–18) serve merely to transport the film 20 over the curved guide against the air pressure developed in the air bearing.

In operation, the film guide for the laser scanner according to the present invention preferably, although optionally, developes an air cushion or bearing to maintain a spacing of the film from the guide as it passes over the guide to conform the film substantially to the curvature of the guide and without any mechanical contact which would tend to scratch the film.

Film 20 is taken from supply reel 50 and passed through pinch rollers 12 and 14 over the film guide 24 in the path shown and drawn through pinch rollers 16 and 18 and stored on take-up reel 52. The air-bearing maintaining the separation of the film 20 from the outer surfaces 27 and 28 of film guide 24 is achieved in a typical embodiment by developing an air pressure of 20 pounds per square inch. With a porous material of sintered bronze or pressed graphite a substantially uniform air-bearing will be developed by the air passing through the material as indicated by the arrows shown in FIG. 2.

When a light beam 43 is developed by a modulated light source 10 via the mirror 15 rotated by motor 19, recordations of the intelligence or information in the light beam will be made on the film surface 21 through the aperture 22 in the vicinity of area 38 at the distal end of aperture 22. The scan may be developed in the direction 54 as illustrated in FIG. 3. The scan rate of the laser will be relatively much faster than the linear movement of the film passing over the aperture 22. For example, the linear movement of the film may be in the order of 1 inch (2.54 cm.) per second while the scan rate of the laser scan 54 may be one millisecond for each film width.

Although any degree of wrap-around of the film over the film guide may be utilized, an angle of wrap of approximately 180 degrees is preferable. In the embodiment illustrated in FIG. 2, the angle of wrap is in the order of 90°–135°. Whatever wrap arrangement is used, it is preferable that the inner surfaces of roller 14 and 16 be substantially along the tangent of the input and output portions of the respective guides to provide a smooth movement of the film and also provide for adequate clearance developed by the air-bearing, if an air-bearing is to be used.

The cooperative action of the film 20 passing through the roller pairs 12 and 14 on the inlet side to the guide 24 and being drawn away from the guide 24 by rollers 16 and 18 and the action of the air bearing on the film surface 21 serves to maintain the film 20 along the curved path as it passes the processing area 38. The curve in the film 20 prevents edge curling. Thus, as seen in FIG. 3, the portion of the film passing over the aperture 22 is essentially a straight line from point 64 to 66. Each subsequent portion of the film that progressively passes over the aperture 22 is similarly straight for the laser to record thereon. Thus, according to the invention, a flat field scan without edge curling is achieved in a curved surface environment. Furthermore, since the laser beam is applied to the film surface without any reflections being effected or generated during the recording process, the disadvantages of previous systems enumerated above are obviated. Accordingly, background fog is eliminated. Furthermore, the problems of system performance with respect to "resolution" and "maximum film density" are eliminated.

In the playback or reading operation, the film 20 is assumed to have been processed for reading modes. Thus, for example, if the film is of a thermally photograhic type material, for example, as described in the above-identified patent applications, Ser. Nos. 790,662, and 790,196, the film as it was recorded as described above and stored on take-up reel 52 would have been processed and recorded as described in the aforesaid applications. The film is then introduced into the system on the storage reel 50 and the film would be passed over the roller and guide system as previously described. However, in the reading operation, the laser will be put into a constant intensity mode causing the light source 10 to generate a reading laser beam that is scanned across the under surface of the film 20. The density variations on the film will allow certain transmission of the laser beam along path 43 for pickup by the light collection optics 13. Optics 13 converts the optical impulses into electrical signals representing the information on the recorded film 20 in a manner well known in this art.

A modified form of the film guide structure includes curved members 270 and 280 suitably supported in spacial relation over the corresponding guide members 27 and 28 as shown in FIGS. 1 and 2. The spacing between the respective pairs of guide members is made sufficient to receive the film 20 and to conform its path to the desired curve.

Members 270 and 280 may be used with or without the air-bearing. Furthermore, the use of members 270 and 280 allows for simpler adjustment of the tension on rollers 12-18 and assures that the film will be guided to a desired predetermined curve.

It will be appreciated that in the reading mode of the operation of the invention, the light of the laser source 10 transmitted freely through aperture 22 to the optics 13 is uninhibited or distorted by reflections and the like which are occasioned in prior art systems in which solid rollers or solid recording plane surfaces are used. Furthermore, the natural tendencies of coiled film to curve longitudinally aid in the operation of a system utilizing the present invention.

What is claimed is:
1. An apparatus for optical scanners of the type wherein an optical beam is scanned over a film in a direction transverse the length of the film, said film having the property of the tendency to curl in the transverse direction of its length, said scanner including means to generate an optical beam and means for supplying and advancing said film over said guide, comprising:
   a. stationary guide means comprising two members spaced apart to provide a passageway for said scanning optical beam, each of said members having curved surface over which said film may be guided causing said film to have a curved surface along the length of the film while passing over said members such that the edges of said film do not curl, whereby said film is essentially flat above said passageway in a direction transverse of the length of the film, said members being oriented such that said film may be passed over said passageway to intercept an optical beam passing through said passageway each of said members further including means for generating a gas bearing between said curved surface and said film passing thereover; and
   b. means for scanning said optical beam in a direction transverse the length of the moving film at said passageway whereby said scanned beam transversely moves across an essentially flat surface of said film having essentially no curling along its edges.

2. A film guide according to claim 1 wherein said gas bearing generating means includes a porous material forming each of said curved surfaces, and a gas chamber within each of said members for providing pressurized gas to said porous surfaces,
   gas supply means for supplying gas under pressure to each of said chambers whereby gas is discharged through said porous material at a flow rate and pressure to maintain a gaseous bearing between said surfaces and said film.

3. A guide according to claim 2 wherein said porous material is selected from the group consisting of bronze and graphite.

4. A guide according to claim 2 wherein said gas is air being supplied to said chamber at 20 psi and said gas bearing is uniformly distributed over said surfaces.

* * * * *